United States Patent
Broadfield

(10) Patent No.: US 9,067,527 B2
(45) Date of Patent: Jun. 30, 2015

(54) WHEEL LOSS DETECTION

(75) Inventor: Gary Broadfield, Oxfordshire (GB)

(73) Assignee: Wheely-Safe Ltd., Staffordshire (GB)

( * ) Notice: Subject to any disclaimer, the term of this patent is extended or adjusted under 35 U.S.C. 154(b) by 133 days.

(21) Appl. No.: 13/638,064

(22) PCT Filed: Mar. 23, 2011

(86) PCT No.: PCT/GB2011/050583
§ 371 (c)(1),
(2), (4) Date: Dec. 18, 2012

(87) PCT Pub. No.: WO2011/121334
PCT Pub. Date: Oct. 6, 2011

(65) Prior Publication Data
US 2013/0088346 A1    Apr. 11, 2013

(30) Foreign Application Priority Data
Mar. 30, 2010    (GB) .................................. 1005289.2

(51) Int. Cl.
*B60Q 1/00*    (2006.01)
*B60B 3/16*    (2006.01)
*B60R 25/10*    (2013.01)

(52) U.S. Cl.
CPC ... *B60Q 1/00* (2013.01); *B60B 3/16* (2013.01); *B60B 3/165* (2013.01); *B60R 25/1001* (2013.01)

(58) Field of Classification Search
None
See application file for complete search history.

(56) References Cited

U.S. PATENT DOCUMENTS

| | | | |
|---|---|---|---|
| 5,552,759 A * | 9/1996 | Stoyka | 340/426.33 |
| 7,012,511 B2 * | 3/2006 | Hayes | 340/438 |
| 7,750,797 B2 * | 7/2010 | Laure et al. | 340/442 |
| 7,994,901 B2 * | 8/2011 | Malis et al. | 340/426.33 |
| 8,525,653 B1 * | 9/2013 | Bing et al. | 340/426.1 |
| 2001/0030466 A1 | 10/2001 | Ehrlich | |
| 2008/0243327 A1 | 10/2008 | Bujak | |
| 2009/0284357 A1 * | 11/2009 | Ortega et al. | 340/425.5 |

FOREIGN PATENT DOCUMENTS

| | | |
|---|---|---|
| DE | 10 2009 020358 A1 | 12/2009 |
| EP | 1 527 904 A2 | 5/2005 |
| JP | 6-63405 | 9/1994 |
| JP | 2005-329907 | 12/2005 |

OTHER PUBLICATIONS

International Search Report for corresponding International Application No. PCT/GB2011/050583 mailed Jul. 4, 2011.
British Search Report for corresponding UK Application No. GB1005289.2 dated Jul. 29, 2010.
English translation of Office Action in corresponding Japanese Patent Application No. 2013-501940 dated Mar. 3, 2015.

* cited by examiner

*Primary Examiner* — Julie Lieu
(74) *Attorney, Agent, or Firm* — Renner, Otto, Boisselle & Sklar, LLP

(57) ABSTRACT

A device and method for detecting wheel loss from a vehicle when the vehicle is in motion. The device (1) is provided with a housing (11) configured for, in use, mounting the device to a wheel (3) such that the device (1) abuts a wheel hub (5) of an axle to which the wheel is attached. A detector (6) is provided for detecting a proximity of the device (1) to the wheel hub (5), and a transmitter (8) is provided for sending an alarm signal in the event that the detector (6) detects that the device (1) is no longer in proximity to the wheel hub (5). In this way, if the wheel starts to become detached from the wheel hub, the detector (1) detects this and can send an alarm to, for example, a receiver unit in the drivers cabin, allowing the driver to take appropriate steps.

10 Claims, 9 Drawing Sheets

WHEEL LOSS DETECTION

FIELD OF THE INVENTION

The present invention relates to detection of wheel loss, and in particular to alerting a user of a vehicle to a risk of wheel loss.

BACKGROUND TO THE INVENTION

Wheel loss from vehicles such as trucks and cars is a problem that can lead to serious accidents and fatalities, and is a problem that can be time consuming and expensive to address. A Transport Research Laboratory (TRL) report on wheel loss on commercial vehicles, published for the Department for Transport (Dft), estimated that the typical annual frequency of wheel fixing problems is as follows for the UK alone.

Between 7,500 and 11,000 wheel fixing defects.
Between 150 and 400 wheel detachments.
Between 50 and 134 resulting in damage only accidents.
Between 10 and 27 resulting in injury accidents.
Between 3 and 7 fatal accidents.

Wheel loss is a serious problem, and there are several solutions that attempt to reduce the likelihood of wheel loss.

Wheels are typically affixed to a vehicle axle using wheel nuts. The UK Department for Transport recommends that any nuts, studs or bolts purchased for fixing wheels comply with British Standard AU 50: Part 2 Section 7a: 1995 for commercial vehicles, or with British Standard AU 50: Part 2 Section 8a: 1985 for cars, to ensure they are of high quality. By specifying a minimum quality for nuts, studs and bolts, this reduces the likelihood that these parts will fail through shear or another mechanism, but it cannot entirely solve the problem. Furthermore, shear isn't the only cause of wheel loss; vibration can cause wheel nuts to loosen, allowing the wheel to become detached.

A number of safety devices are available that are designed to help keep wheel nuts tight or visually indicate if nuts are becoming loose. For example, a wheel nut locking device is available that prevents wheel loss caused by loosening of the wheel not owing to vibration. The device uses a modified wheel stud and a spring-loaded counter-threaded locking cap that covers the wheel nut, holding it in place. The device does not interfere with the original nut, and so it maintains maximum clamp force. In the event of the wheel nut starting to loosen, the locking cap tightens against the wheel nut, locking it into place, to ensure that the wheel does not become detached from the vehicle. This device may be used on trucks, buses and coaches, and the device has also been developed to ensure bolt security in the rail industry.

Another type of device replaces an existing wheel nut with a heavy-duty locking nut, and aims to stop the possibility of losing wheels from vehicles. The locking nut is split into three sections; a nut, a hexagon-flanged washer and a flat faced cup washer. The top two sections have interlocking cams. When subjected to vibration, the interlocking cams attempt to rise against each other. As the angle of the cam is greater than the pitch angle of the thread on the stud, a wedging action takes place that causes the heavy duty locking nut to maintain the clamping-force and to lock, thereby maintaining the wheel secure on the axle.

A different approach to the problem of vibration loosening is to provide an indication to show when a nut has started to become loose. A plastic indicator is placed between the nut and the wheel, and is visible on an outer rim of the wheel. Each indicator is aligned with the radius of the wheel when the nut is tightened. If a wheel nut starts to loosen, the plastic indicator will be free to move and will no longer be aligned with the radius of the wheel. A visual inspection is required to determine whether or not a wheel nut has loosened.

The existing solutions described above are either nut locking systems or nut movement indication systems. However, wheel loosening cannot be observed within the cabin of the vehicle and hence an occurrence at the beginning of a journey could go undetected on the way to failure. Furthermore, most systems are easily attached therefore can easily become detached.

SUMMARY OF THE INVENTION

The inventor has realised that a system that provides an indication to the driver of a vehicle that a wheel is detaching from its axle would allow the driver to take corrective action, in most cases long before the loosening causes the wheel to detach.

According to a first aspect of the invention, there is provided a device for detecting wheel loss from a vehicle while the vehicle is in motion. The device is provided with a housing configured for, in use, mounting the device to a wheel such that the device abuts a wheel hub of an axle to which the wheel is attached. A detector is provided for detecting a proximity of the device to the wheel hub, and a transmitter is provided for sending an alarm signal in the event that the detector detects that the device is no longer in proximity to the wheel hub. In this way, if the wheel starts to become detached from the wheel hub, the detector detects this and can send an alarm to, for example, a receiver unit in the driver's cabin, allowing the driver to take appropriate steps.

Any suitable detector may be used. Examples of suitable detectors include a mechanical switch, a magnetic switch, a capacitive switch, a pressure sensitive switch and a resistive switch.

The detector may comprise a mechanical actuator that makes an electrical circuit, the actuator being biased by biasing means (such as a coil or leaf spring) towards the wheel hub. In the event that the device is no longer in proximity to the wheel hub, the action of the biasing means on the actuator breaks the electrical circuit, thereby triggering the alarm signal.

The device may be further provided with a processor and a memory, the memory arranged to store an identifier for the device, wherein the alarm signal includes the identifier. In this way, each device can be given an identifier associated with a particular wheel, so the driver is aware of which wheel is at risk of detaching from the axle.

The device may also be provided with a docking port for connecting the device to a receiver unit. The docking port is arranged to receive the identifier from the receiver unit before storing the identifier in the memory. This allows a user to programme the device using the receiver and assign an identifier to each device, allowing each device to be associated with a particular wheel.

As an option, the housing is configured for mounting the device in a recess of the wheel.

The device may be provided with a shape feature arranged to interlock with a corresponding shape feature of the recess, wherein the interlocking shape features prevent the device from rotating in the recess.

As an option, the device further comprises an internal case disposed within the housing and moveable relative to the housing. The internal case, in use, abuts either the wheel rim or the wheel hub, and is biased away from the housing. The detector is arranged to detect a movement of the internal case relative to the housing.

According to a second aspect of the invention, there is provided a wheel loss detection system for detecting wheel loss while the vehicle is in motion. A detection device is mounted to a wheel rim adjacent to a wheel hub to which the wheel is attached. The detection device comprises a detector for detecting a proximity of the device to the wheel hub, and a transmitter for sending an alarm signal in the event that the detector detects that the device is no longer in close proximity to the wheel hub. A receiving unit is also provided that comprises a receiver for receiving from the detection device the alarm signal, and means for alerting a driver of a vehicle in the event that an alarm signal is received.

The alarm signal may comprise a device identifier associated with a wheel on the vehicle, and the receiving unit comprises means to alert the driver of the identity of the associated wheel.

The detector may be selected from one of a mechanical switch, a magnetic switch, a capacitive switch, a pressure sensitive switch and a resistive switch.

The device may be further provided with a shape feature arranged to interlock with a corresponding shape feature of a recess in the wheel in which the device is mounted, wherein the interlocking shape features prevent the device from rotating in the recess.

According to a third aspect of the invention, there is provided a method of fitting a wheel loss detection device. A wheel loss detection device is mounted to a wheel. The wheel loss detection device comprises a detector for detecting a proximity of the device to a wheel hub and a transmitter for sending an alarm signal in the event that the detector detects that the device is no longer in close proximity to the wheel hub. The wheel is then fitted to the wheel hub such that the wheel loss detection device is adjacent to the wheel hub.

Any suitable means may be used to mount the device to the wheel. For example, a recess may be machined from the wheel rim and the device mounted in the recess.

The method may further comprise creating a shape feature in the recess, the shape feature arranged to interlock with a corresponding shape feature of the detection device, wherein the interlocking shape features prevent the device from rotating in the recess.

DETAILED DESCRIPTION OF CERTAIN EMBODIMENTS

Rather than attempting to limit the nut movement (which does not solve the problem of wheel loss caused by stud failure), the invention detects wheel loss rather than movement of wheel nuts. Note that when the following description refers to detecting wheel loss, this encompasses detecting the onset of wheel loss, for example, when a wheel starts to move away from a wheel hub. Note also that the term wheel hub is used throughout, but the invention equally applies to abutting a device to a wheel drum.

Figure 1:
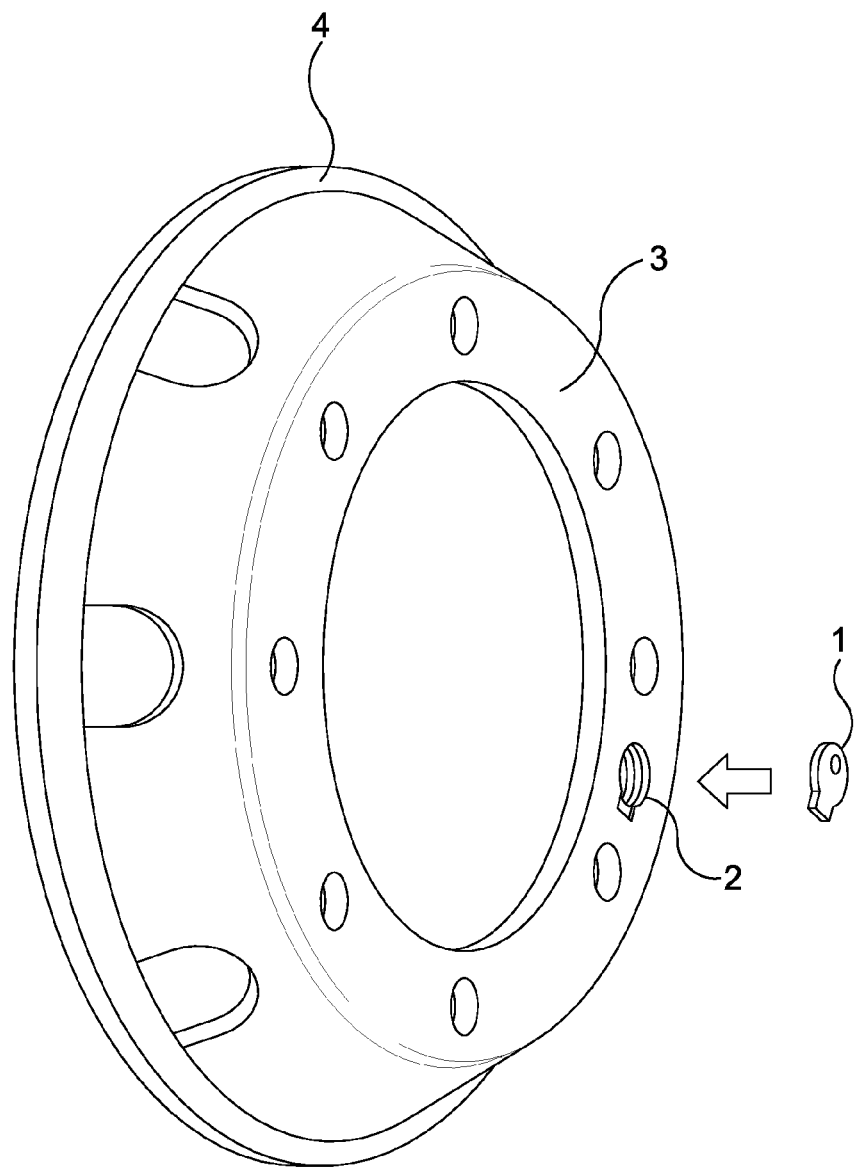
FIG. 1 shows a perspective view of a wheel rim and detection unit according to an embodiment of the invention.

Turning to FIG. 1, a detection device 1 according to an embodiment of the invention is illustrated. The detection device 1 fits into a recess 2 that has in machined into a wheel rim 4 of a wheel. The recess 2 depth is selected such that a back face of the detection unit is accurately aligned with the back face of the wheel rim 4. Once the detection device 1 has been located in the recess 2, the wheel and type are assembled to the wheel hub (not shown) such that the back face of the detection device 1 is located against a face of the wheel hub.

Figure 2:
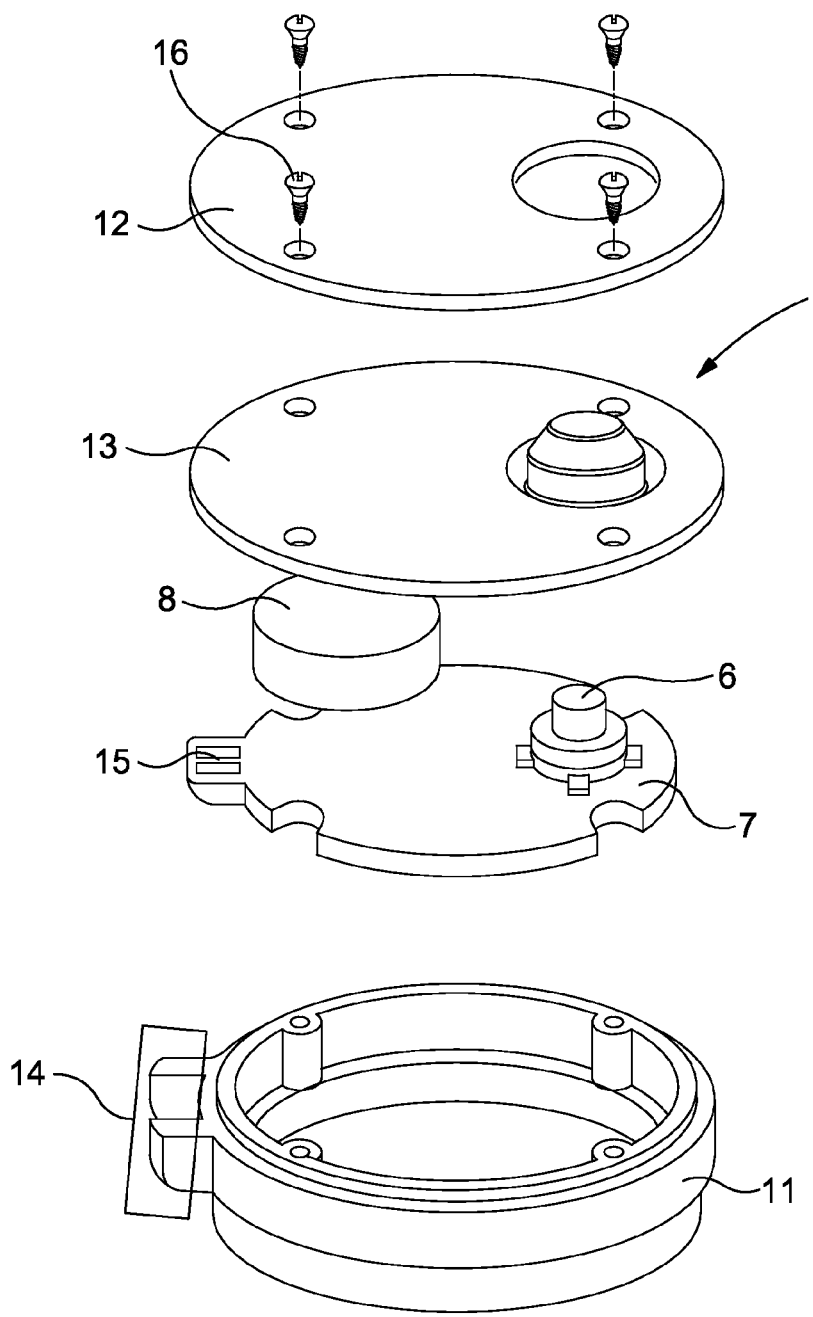
FIG. 2 shows an exploded view of the detection unit illustrated in FIG. 1.

Turning now to FIG. 2, the detection device 1 is illustrated. The detection device 1 is provided with a detector 6 that presses against the wheel hub and senses the contact with the wheel hub. The detector 6 is mounted on a printed circuit board (PCB) 7, along with transmission circuitry 8. Radio Frequency (RF) transmission is suitable, although that it will be appreciated that any type of wireless transmission is suitable. The PCB 7 also has a docking connector 15 that protrudes into a docking area 14, allowing the unit to be docked to a receiving unit. The docking area is a shape feature that protrudes and allows it to be fitted to a corresponding shape feature of the recess 2, thereby preventing rotation of the detection unit 1 in the recess 2 during rotation of the wheel.

The PCB 7 is mounted in a housing 11 with a seal 13 placed over it. A back plate 12 closes the PCB 7 in the housing 11 using screws 16. The seal 13 provides hermetic sealing and allows for movement of the detector 6.

Figure 3:
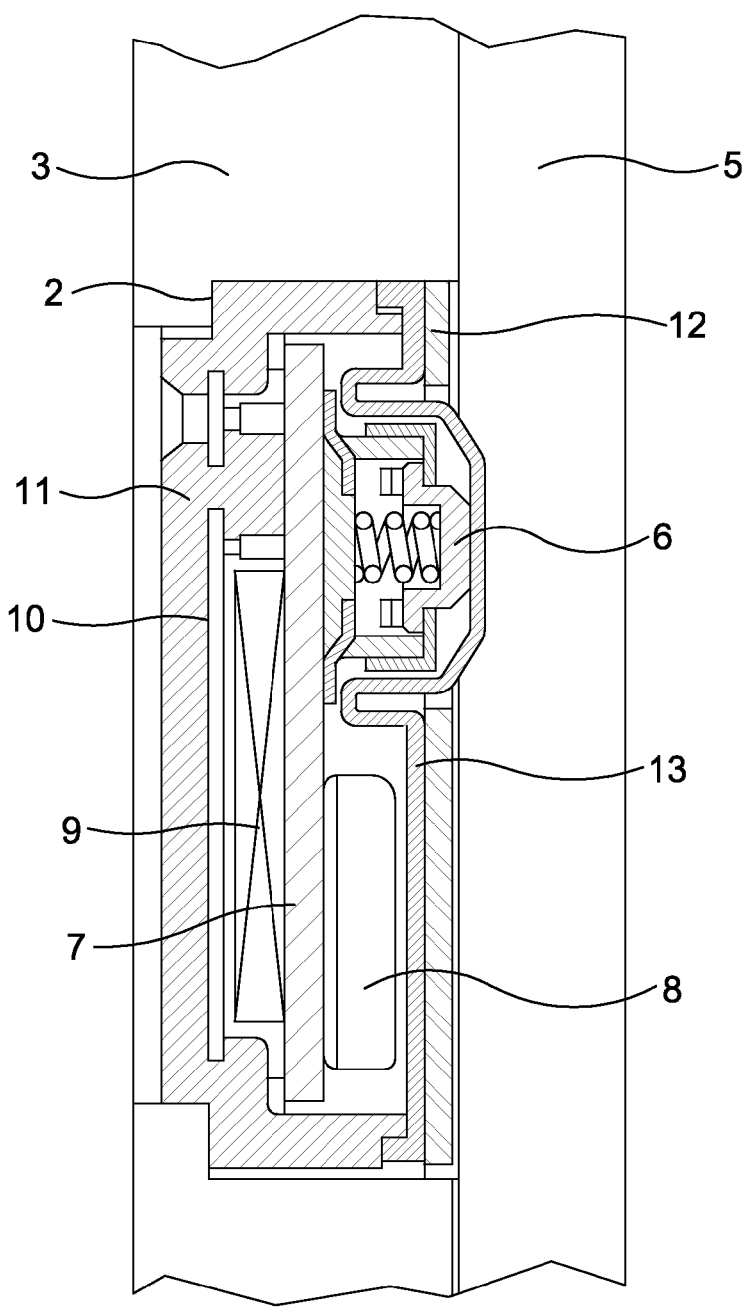
FIG. 3 is a cross-section view of the detection unit of FIG. 1 attached to a wheel drum.

Turning now to FIG. 3, the detector 6 of the detection device 1 abuts the wheel hub 5 as it is located in the recess machined into the wheel rim 4. The detector 6 passes through an opening in the back plate 12 but is still protected by the seal 13. Because the recess 2 is accurately machined, the detection device 1 is located accurately and when the wheel is located securely to the wheel hub, the detector 6 signals that the wheel is located securely. If the wheel rim 4 starts to loosen from the wheel hub, this is detected by the detector 6, which in turn instructs the RF circuitry to send an alarm signal.

Figure 4:
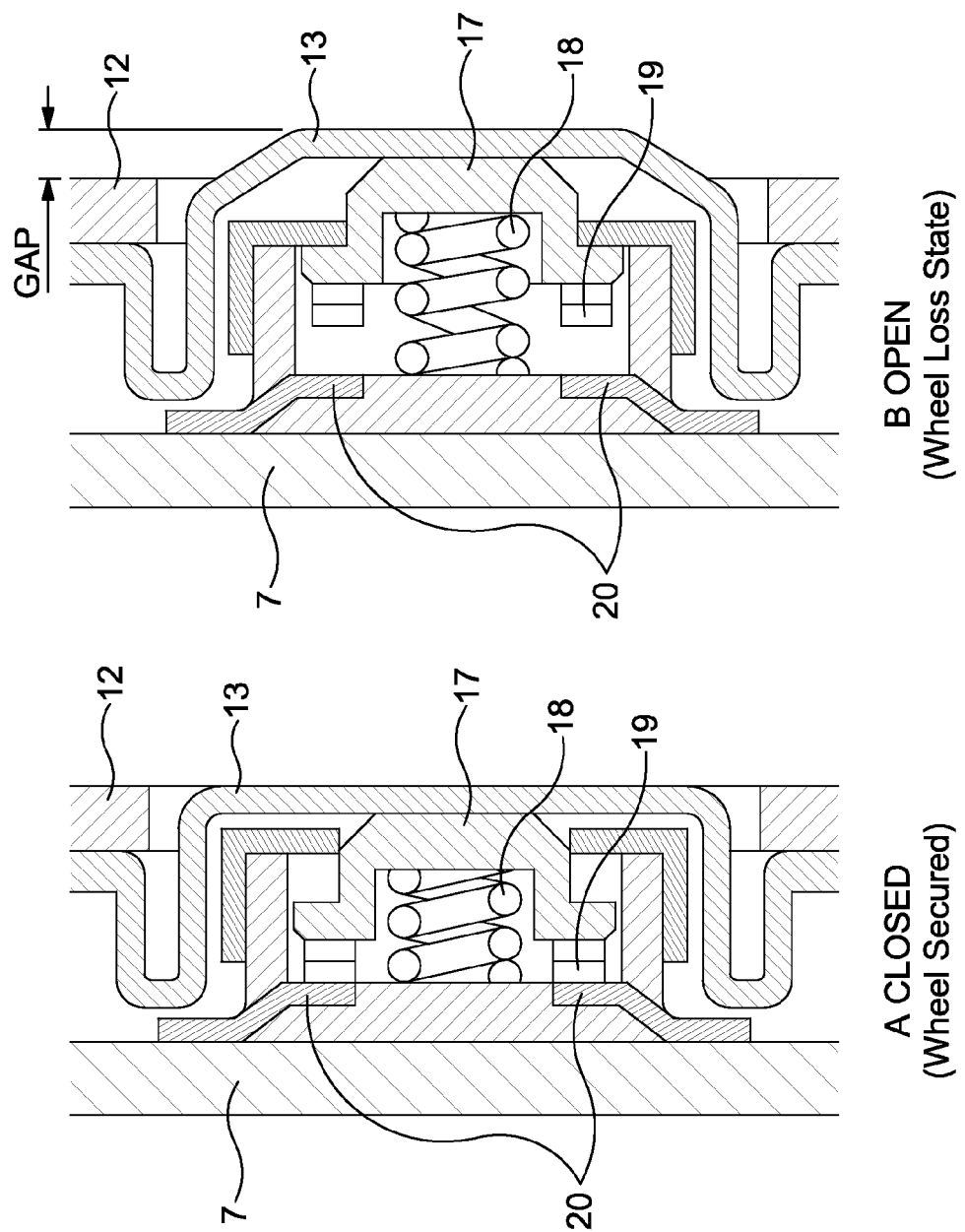
FIG. 4 is a cross-section view of the detection unit of FIG. 1 in a closed and an open position.

It will be appreciated that many different types of detector may be used. FIG. 4 shows an exemplary embodiment in which a detector 6 is a mechanical switch having a biasing means such as a spring to bias the detector towards the wheel hub 5.

FIG. 4A shows the detector 6 in a closed position in which the wheel is secured to the wheel hub 5. The detector 6 comprises a switch actuator 17, a coil spring 18 in contact with the switch actuator, and an actuator spring 19 that is biased towards the PCB 7. The PCB is provided with switch terminals 20. When the wheel is secured, the wheel hub 5 is flush against the wheel rim 4, and the switch actuator 17 is pressed down, thereby making contact with the switch terminals 20 and closing the circuit. As shown in FIG. 4B, if the wheel starts to loosen from the wheel hub 5, the coil spring pushed the actuator switch 17 towards the wheel hub, thereby breaking the electrical contact with the switch terminals 20. This is detected by a processor located on the PCB 7, and the transmission circuitry 8 sends an alarm signal.

Only one device per wheel is necessary, and each detection device 1 on a particular vehicle will have some way of identifying itself when an alarm signal is sent. This may be, for example, transmitting at different frequencies or using an identifying header in an alarm signal. The processor in the PCB 7 may also be arranged to monitor battery life and send a different alarm signal in the event that battery life becomes low.

Figure 5:
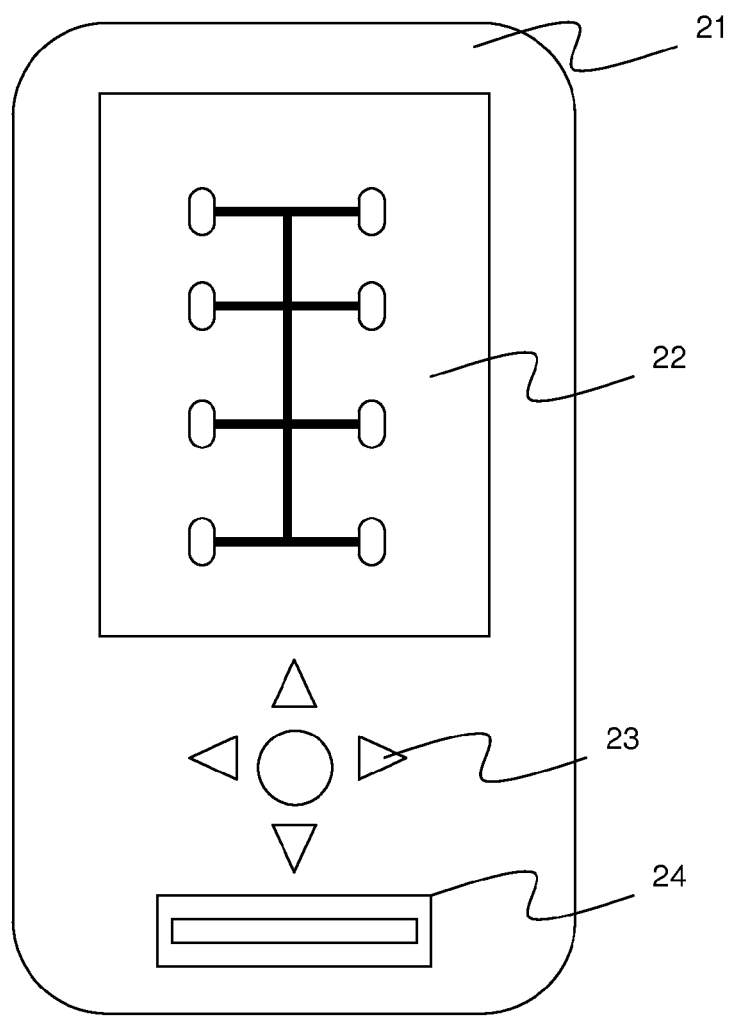
FIG. 5 illustrates schematically a receiver unit for communicating with the detection unit of FIG. 1.

Signals sent by the transmission circuitry 8 are received by a receiver unit 21, as shown in FIG. 5. The receiver unit 21 is used to programme the detection device 1 associated with each wheel. As mentioned above, each detection device 1 is provided with a docking area 14. The receiver unit 21 comprises a docking station 24 that is connectable using the docking area 14 to the detection device 1. A display 22 and navigation keys 23 are provided to show information to a user of the receiver unit and to allow the user to enter data to programme the detection device 1. This allows, for example, a user to select which wheel the detection device 1 will be fitted to, and to programme the detection device 1 to identify itself with an identifier associated with that wheel.

Once the detection devices 1 have been fitted to the wheels, the receiver unit 21 is used to alert the driver to wheels at risk of becoming loose. If a detection device transmits and alarm signal, the display 22 of the receiver unit 21 shows on the display 22 which wheel is coming loose, and an alarm (for example an audible alarm) may be used to alert the driver. Once the driver is alerted, he can stop the vehicle and attend to the wheel.

Figure 6:
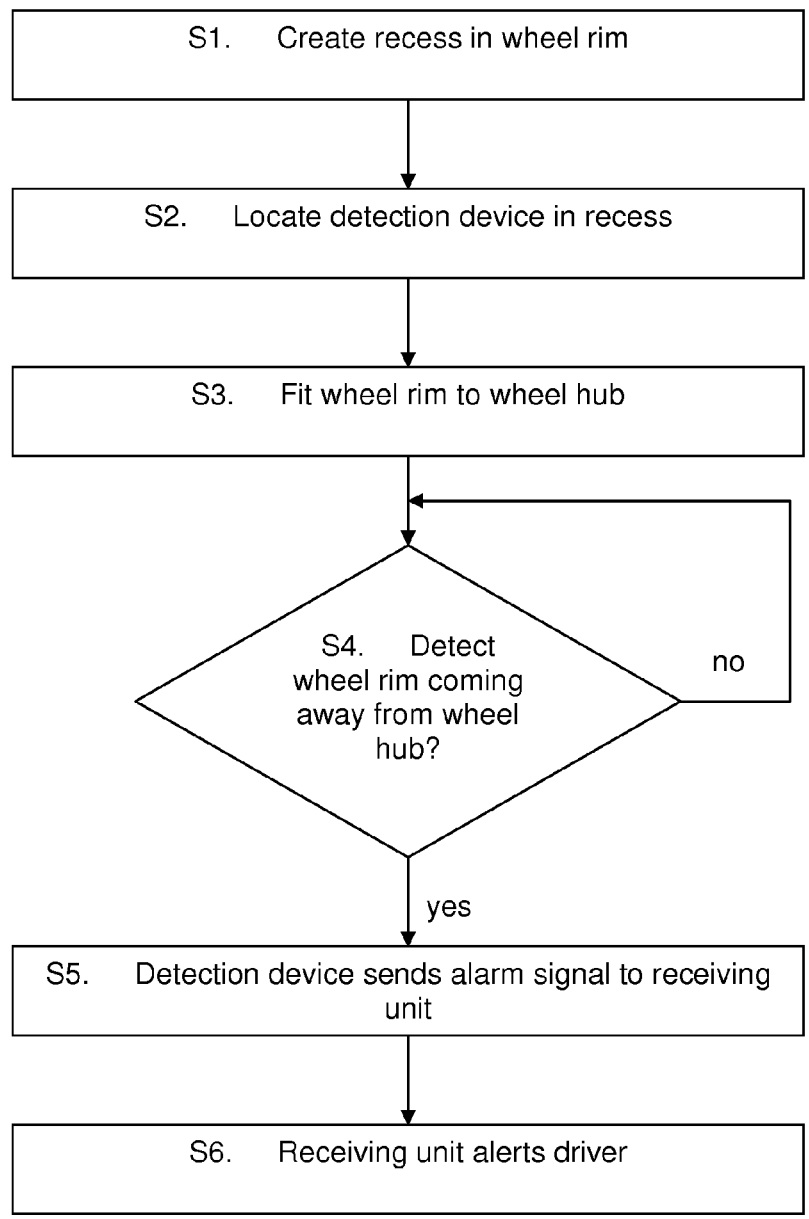
FIG. 6 is a flow diagram illustrating the steps of fitting a detection unit to a wheel.

FIG. 6 is a flow diagram illustrating the fitting an operation of a detection device 1. The following numbering corresponds with the numbering of FIG. 6.

S1. A recess 2 is created in a wheel rim 4. This may be done by machining the recess 2.
S2. The detection device 1 is located in the recess.
S3. The wheel rim 4 is fitted to the wheel hub 5 such that the detection device 1 is adjacent to the wheel hub 5.

In use, the following steps occur:
S4. The detector 6 detects whether the wheel rim 4 has become loose from the wheel hub 5. If not, then this step is repeated.
S5. If the detector 6 detects that the wheel rim 4 has become loose from the wheel hub 5, it transmits an alarm signal.
S6. The receiving unit 21 receives the alarm signal and alerts the driver. This allows the driver to stop the vehicle and take appropriate steps to ensure that the wheel is securely attached to the wheel hub.

Figure 7A:
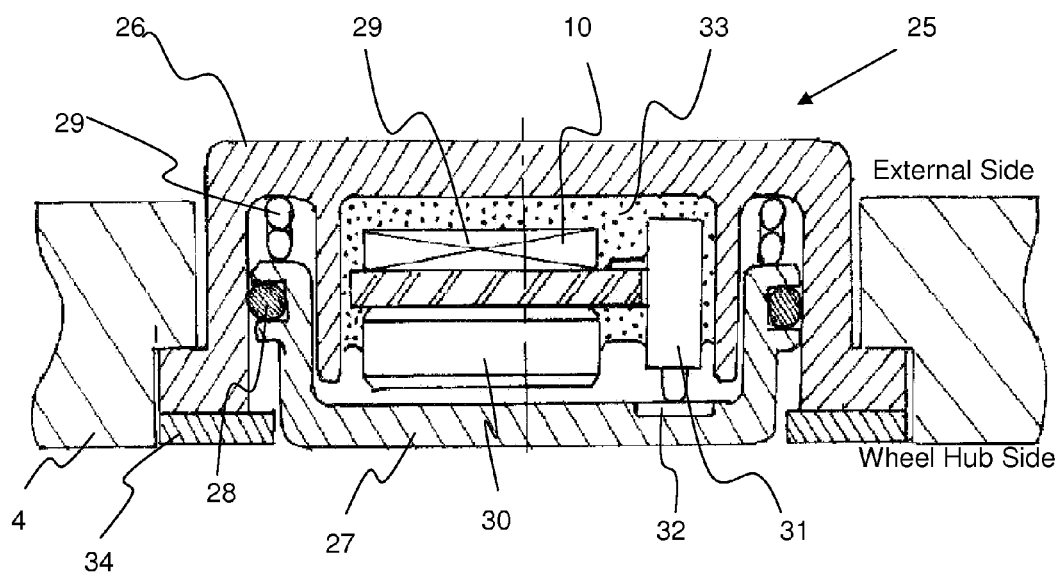
FIG. 7 is a cross-section view of a detection unit according to a further embodiment of the invention, shown in both a closed and an open position.

In a further embodiment of the invention, the entire back cover of the detection device acts as a detector. FIGS. 7 and 8 show cross-sectional and exploded views of the device according to the further embodiment.

In this embodiment, the device 25 has an external case 26 and an internal case 27. The external case 26 locates in a recess in the wheel rim 4, and the internal case 27 abuts against the wheel hub of an axle to which the wheel is attached (note that the device could be used the other way round, so that the internal case abuts against the wheel rim rather than the wheel hub. However, this is not preferred as it would require some movement of the external case relative to the wheel rim). An O-ring seal 28 is located between the internal case 27 and the external case 26 to prevent moisture from entering the interior of the external case 26.

A return spring 29 is also disposed between the internal case 26 and the external case 27, arranged to bias the internal case 27 away from the external case. As with the previous embodiment, the device also comprises a PCB 29, a battery 30 for powering the device, and a detector 31 that presses against a switch plate 32 located on an inner surface of the internal case 27. The PCB 29 and detector 31 are all mounted in potting epoxy 33.

The detector 31 is fixed relative to the external case 26, and presses against a switching plate 32 that is fixed relative to the internal case 27. The detector 31 will therefore detect any movement of the internal case 27 relative to the external case 26.

A retainer plate 34 is also provided for locating between the external case 26 and the wheel hub. The internal case 27 can pass through the retainer plate 34.

Figure 7B:
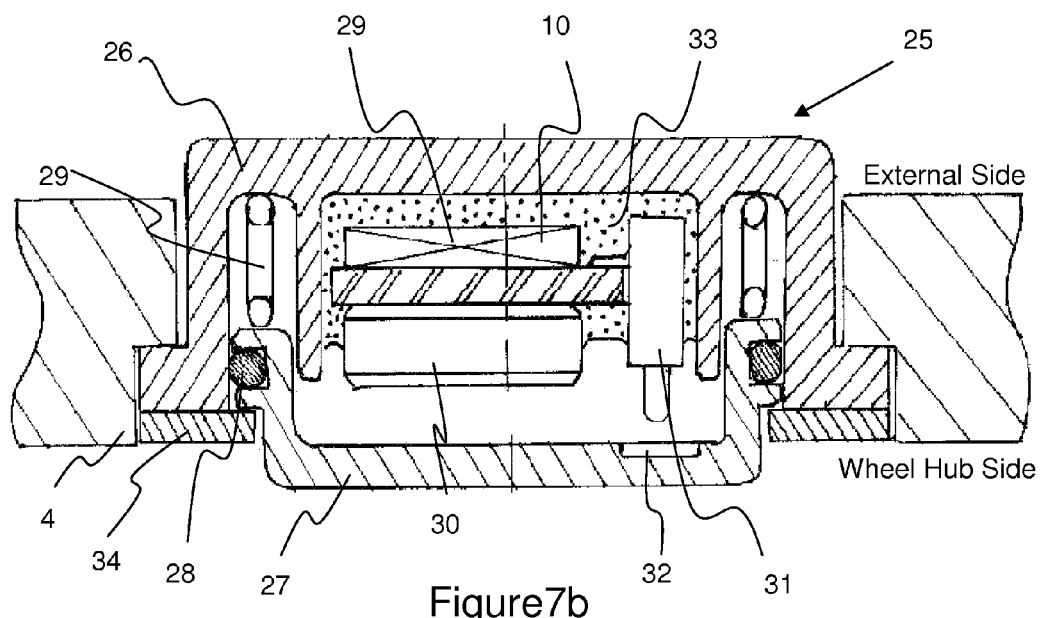
Figure 8:
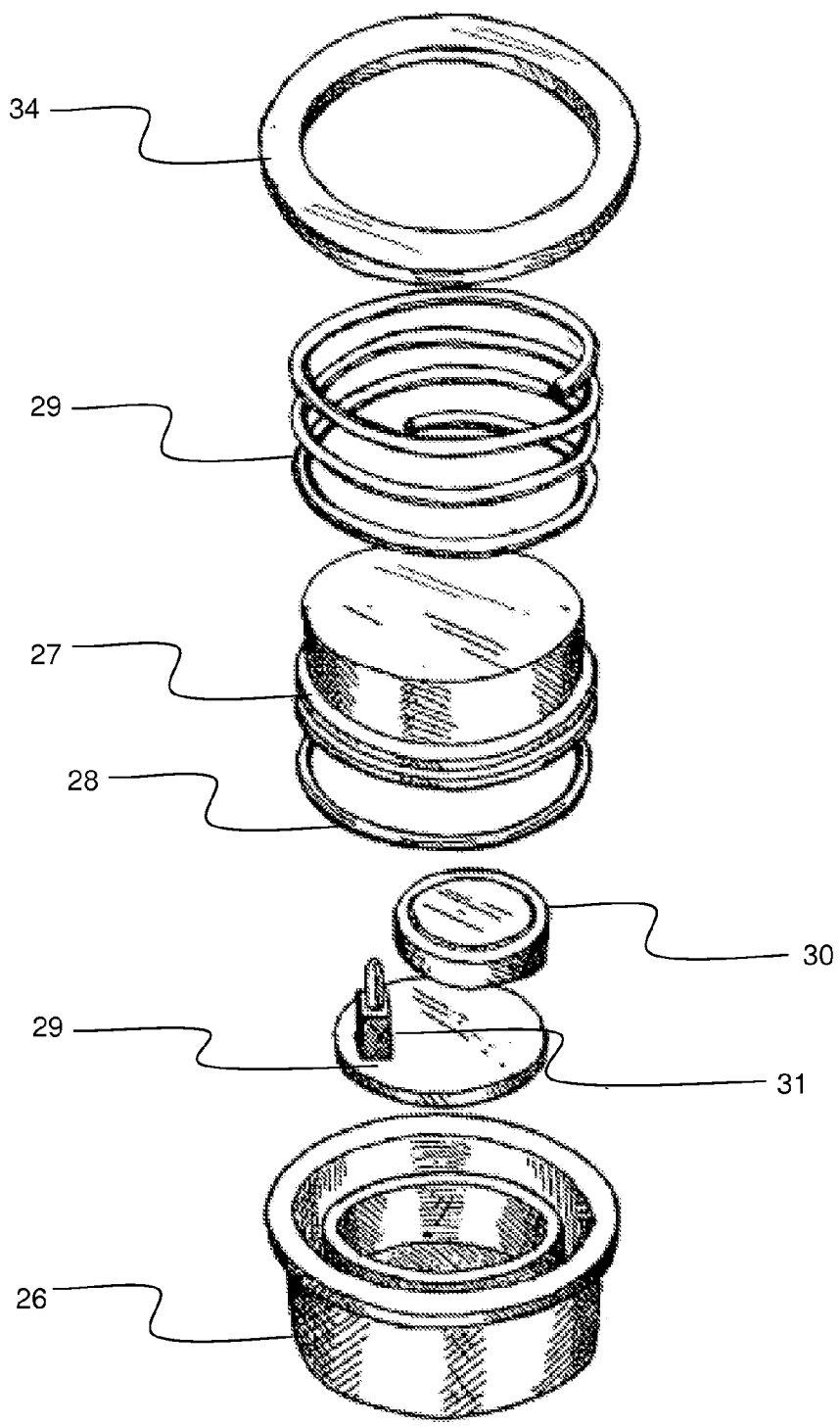
FIG. 8 shows an exploded view of the detection unit of FIG. 7.

As can be seen from FIG. 7b, if the wheel rim 4 starts to detach from the wheel hub then the internal case 27, biased by the return spring 29, starts to move away from the external case 26. This movement is detected by the detector 31, which sends an alarm signal. As with the first embodiment, the detector 31 may operate in any of several ways, and may a switch such as a mechanical switch, a magnetic switch, a capacitive switch, a pressure sensitive switch or a resistive switch. The detector is illustrated in FIGS. 7 and 8 as being a mechanical actuator that makes an electrical circuit. The actuator is biased towards the wheel hub, so that when the device is in the configuration shown in FIG. 7b, the electrical circuit is broken, thereby triggering the alarm signal.

The main advantage of the further embodiment is that it is more robust; there is no need for a flexible seal 13, as with the first embodiment. The device according to the further embodiment otherwise operates in a very similar way to, and is compatible with, the device described in the first embodiment.

Figure 9:
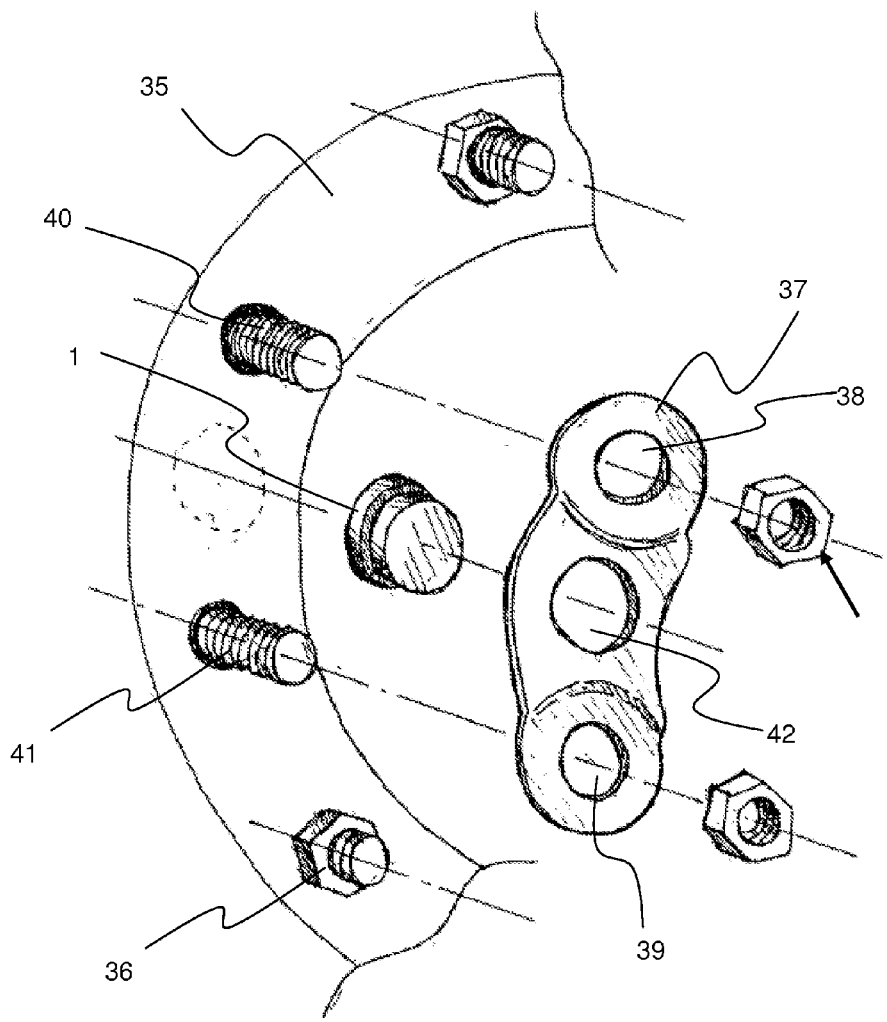
FIG. 9 shows an exploded perspective view of a fixing mechanism according to a further embodiment of the invention.

A further embodiment showing an alternative mounting arrangement is shown in FIG. 9. The embodiments described above describe the detection device 1 being mounted in a recess 2 of a wheel rim 4. The embodiment shown in FIG. 9 does not require a recess to be machined in the wheel rim.

A wheel rim 35 is mounted to a wheel hub using wheel hub studs 40, 41 and locking nuts 36. A mounting plate 37 has two apertures 38, 39 which are spaced apart so as to allow them to fit over two adjacent wheel hub studs 40, 41. By screwing nuts onto the wheel hub studs 40, 41, which the mounting plate 37 located between the nuts and the wheel rim 35, the mounting plate can be securely fitted to the wheel rim.

The mounting plate 37 further comprises an attachment point 42 to which a detection device 1 can be attached. In use, the detection device abuts the wheel rim and, indirectly, the wheel hub. If the nuts start to loosen, and the wheel rim 4 moves away from the wheel hub, then the detection device will no longer firmly abut the wheel rim 4, and so indirectly will no longer firmly abut the wheel hub, and so the driver can be alerted that the wheel rim is moving away from the wheel hub and the same way as described above.

Other than the mounting arrangement, this embodiment is otherwise compatible with the above-described embodiments.

The invention differs substantially from the prior art in that it provides apparatus and a method for detecting loss of the wheel from the wheel hub, rather than detecting loosening of the wheel nuts or attempting to prevent loosening of the wheel nuts. This allows the driver of the vehicle to be alerted to a potential problem during a journey, even where the problem was not evident before the start of the journey.

It will be appreciated by the person of skill in the art that various modifications may be made to the above described embodiment without departing from the scope of the present invention. For example, the examples given above described RF transmission, although other types of wireless communication between the detection device 1 and the receiver unit 21 could be used. Furthermore, while the detector is described as a mechanical switch, other types of detection device may be used. For example, switches may be used that are magnetic, capacitive, resistance-based or pressure sensitive. The switch must be able to, in some way, detect the proximity of the wheel to the wheel hub and generate a signal in the event that the wheel is no longer sufficiently close to the wheel hub.

The invention claimed is:

1. A device for detecting wheel loss from a vehicle while the vehicle is in motion, the device comprising:
    a housing configured for, in use, mounting the device to a wheel rim of a wheel, such that the device indirectly abuts a wheel hub of an axle to which the wheel is attached, such that the wheel is disposed between the device and the wheel hub, said housing includes a mounting plate comprising an aperture arranged to fit over a wheel hub stud;
    a detector for detecting a proximity of the device to the wheel rim, and hence indirectly detecting a proximity of the device to the wheel hub;
    a transmitter for sending an alarm signal in the event that the detector indirectly detects that the device is no longer in proximity to the wheel hub;
    wherein the device is coupled to a mounting plate comprising an aperture arranged to fit over a wheel hub stud, such that, in use, the device abuts the wheel rim.

2. The device according to claim 1, wherein the detector is selected from one of a mechanical switch, a magnetic switch, a capacitive switch, a pressure sensitive switch and a resistive switch.

3. The device according to claim 1, wherein the detector comprises a mechanical actuator that makes an electrical circuit, the actuator being biased by biasing means towards the wheel hub, wherein in the event that the device is no longer in proximity to the wheel hub, the action of the biasing means on the actuator breaks the electrical circuit, thereby triggering the alarm signal.

4. The device according to claim 1, further comprising a processor and a memory, the memory arranged to store an identifier for the device, wherein the alarm signal includes the identifier.

5. The device according to claim 4, further comprising a docking port for connecting the device to a receiver unit, the docking port arranged to receive the identifier from the receiver unit before storing the identifier in the memory.

6. The device according to claim 1, further comprising an internal case disposed within the housing and moveable relative to the housing, wherein the internal case is biased away from the housing and the detector is arranged to detect a movement of the internal case relative to the housing.

7. A wheel loss detection system for detecting wheel loss while the vehicle is in motion, the system comprising:
    a mounting plate comprising an aperture arranged to fit over a wheel hub stud;
    a detection device coupled to the mounting plate such that, in use, the device abuts a wheel rim of a wheel, adjacent to a wheel hub to which the wheel is attached, the wheel being disposed between the wheel hub and the detection device, the detection device comprising a detector for detecting a proximity of the device to the wheel rim, and hence indirectly detecting a proximity of the device to the wheel hub, and a transmitter for sending an alarm signal in the event that the detector indirectly detects that the device is no longer in proximity to the wheel hub;
    a receiving unit comprising a receiver for receiving from the detection device the alarm signal, and means for alerting a driver of a vehicle in the event that an alarm signal is received.

8. The wheel loss detection system according to claim 7, wherein the alarm signal comprises a device identifier associated with a wheel on the vehicle, and the receiving unit comprises means to alert the driver of the identity of the associated wheel.

9. The wheel loss detection system according to claim 7, wherein the detector is selected from one of a mechanical switch, a magnetic switch, a capacitive switch, a pressure sensitive switch and a resistive switch.

10. A method of fitting a wheel loss detection device, the method comprising:
    mounting a wheel loss detection device to a wheel rim, the wheel loss detection device being coupled to a mounting plate such that, in use, the device abuts the wheel rim, and wherein the mounting plate is attached to a wheel hub by means of an aperture arranged to fit over a wheel hub stud;
    the wheel loss detection device comprising a detector for detecting a proximity of the device to the wheel rim, and hence indirectly detecting a proximity of the device to the wheel hub, and a transmitter for sending an alarm signal in the event that the detector indirectly detects that the device is no longer in proximity to the wheel hub;
    fitting the wheel to the wheel hub such that the wheel is disposed between the wheel hub and the detection device.

* * * * *